United States Patent Office 2,817,509
Patented Dec. 24, 1957

2,817,509

LINED CRUCIBLES

Earl A. Solomon, Orchard Park, N. Y., assignor to Electro Refractories & Abrasives Corporation, Buffalo, N. Y.

No Drawing. Application August 19, 1954
Serial No. 451,065

3 Claims. (Cl. 266—43)

This invention relates to improvements in crucibles for melting metals or holding molten metal, particularly those of the so-called carbon bonded type which have been made of mixtures of silicon carbide and graphite in general accord with the teachings of U. S. Patents 1,356,939; 1,458,723; 1,458,724; 1,458,725; 1,458,726 and 1,479,107 to John L. Ohman.

Such crucibles have been made of mixtures of flake graphite and silicon carbide held together by a tar binder which is thereafter carbonized by baking in a reducing atmosphere and the crucible then glazed in accord with U. S. Patent 1,828,767 to Grant S. Diamond. In certain cases modified crucibles of this type have been manufactured by making the inner face thereof of a modified mix containing fused alumina in place of a part or all of the silicon carbide, with the outer portion of crucible being made of the regular type of material to preserve high strength and thermal conductivity in the crucible. These duplex or lined crucibles have been superior to the all-SiC type in resisting certain metals such as alloys high in nickel or iron. They have also been unusually resistant to corrosion by the fluxes used on top of the metal in many instances.

They have, however, been unsatisfactory in that the bonding of the alumina layer to the rest of the crucible has been weak so that it pulls away from the backing layer and also fail to hold the glaze as tightly as is desired. Blisters or open spots within the alumina portion itself also occurs at times.

I have found that these deficiences can be largely eliminated while retaining the other advantages of the duplex structure by selecting for the alumina layer, special highly calcined high alumina grog consisting of 90% or more of $Al_2O_3$ and particularly with just enough but not too much porosity within the grog itself. The percentage of porosity should be from 5 to 25% by volume, 5 to 15% being preferred. Fused alumina, which has heretofore been used, is high in alumina but seems to be too dense and smooth to be properly gripped by either the tar bond or the glaze.

One material which I have found to give markedly superior results is so-called Tabular Corundum produced by the Aluminum Company of America. This consists of over 99% $Al_2O_3$ and has a porosity which I find varies between 5 and 15% by volume. It has a very angular fracture with a high ratio of surface area to weight, all of which contribute to its ability to be firmly held by an adhesive binder.

I have also used successfully grog produced by admixing finely ground kaolin clay with sufficient fine pure alumina to raise the chemical analysis of the grog to 90% or more of $Al_2O_3$ and firing this mixture to Cone 18 or higher. Thereafter the fired material is crushed to form porous aggregates of say 14 mesh and finer containing 15 to 23% by volume, of pores.

In the practice of my invention, these porous particles of high aluminous material of whichever sort are admixed dry with the proper proportions of flake graphite and sometimes also of silicon carbide, tar is added and the mix prepared in the way familiar to those in this art preparatory to forming into a crucible.

In making a crucible, I first form the outer portion using mix of the usual non-alumina type by spinning or jiggering it in a barrel shaped mold. When this is roughly formed, I add the alumina-containing mix and jigger it into place inside and in contact with the shell of backing mix already formed. The two layers should then be compacted as tightly together as possible using a hydraulic balloon or other methods familiar to the industry.

The assembled crucible is then removed from the mold and manufacture completed in the way usual to the industry, including baking to volatilize the tar leaving behind a carbon binder and then glazing the carbonized body as set forth by Diamond (above).

In order that my method of procedure may be completely clear, I give below examples of my use of the various materials required to form my duplex body.

First I prepare mix for the outer shell, of which the following representative:

25 parts by weight flake graphite
5 parts by weight flint powder
50 parts by weight SiC 16 mesh and finer
24 parts by weight tar This is mixed at about 190–200° F. until a uniform semiplastic mix results. This is then allowed to cool to about 100° F. before forming.

A mix for the inner high alumina portion is:

21 parts by weight flake graphite
9 parts by weight flint powder
26 parts by weight tabular corundum 14 mesh and finer
26 parts by weight aluminum oxide powder
18 parts by weight tar (on a calcined basis this yields approximately 30% by weight of tabular corundum and 24% graphite).

This mix is also made up hot and formed into place after cooling just as is the outside mix. The formed crucible is then baked and a borax glaze applied.

I find that for the high alumina lining, it is desirable to so proportion the porous alumina grog that it constitutes from 20 to 40% by weight of the final calcined body. Silicon carbide can also be included in the lining but should not exceed the weight of porous alumina grog if best slag resistance is to be secured.

I find that best shock-resistance can be combined with chemical inertness if the high alumina portion of the crucible contains from 15 to 35% by weight of flake graphite, from 15 to 25% being most commonly used, and from 20 to 40% by weight of porous high alumina grog. From 5 to 10% of silica in this portion of the body helps secure even adherence of the glaze. Residual carbon from the tar amounts to 8 to 10% of the final body. This serves as the bond. The remainder of the body may be fine alumina, silicon carbide, mullite or other refractory material.

Having thus described my invention and given examples of the special materials required therein, what I claim is:

1. In a duplex crucible bonded with carbon throughout, an inner facing portion consisting of 15 to 35% by weight of flake graphite, 20 to 40% by weight of porous alumina grog, 5 to 10% by weight of flint powder and 8 to 10% by weight of bond carbon, the remainder of said portion being composed of material selected from the group consisting of other alumina, silicon carbide and mullite, the porous alumina grog having from 5 to 25% porosity and consisting of over 90% by weight of aluminum oxide.

2. In a duplex crucible bonded with carbon throughout, an inner facing portion consisting of 15 to 35% by weight of flake graphite, 20 to 40% by weight of porous alumina grog, 5 to 10% by weight of flint powder and 8 to 10% by weight of bond carbon, the remainder of said portion being composed of silicon carbide of less weight than the alumina grog, the alumina grog having from 5 to 25% porosity and consisting of over 90% by weight aluminum oxide.

3. A duplex crucible in accordance with claim 1 in which the alumina grog is of the type called tabular corundum.

References Cited in the file of this patent

UNITED STATES PATENTS

| | | |
|---|---|---|
| 1,289,578 | Tone | Dec. 31, 1918 |
| 1,663,660 | Hottinger | Mar. 27, 1928 |
| 1,852,162 | Harris et al. | Apr. 5, 1932 |

FOREIGN PATENTS

| | | |
|---|---|---|
| 465,313 | Great Britain | Mar. 5, 1937 |